H. MERRILL.
Grain Dryer.
No. 109,536.  Patented Nov. 22, 1870.
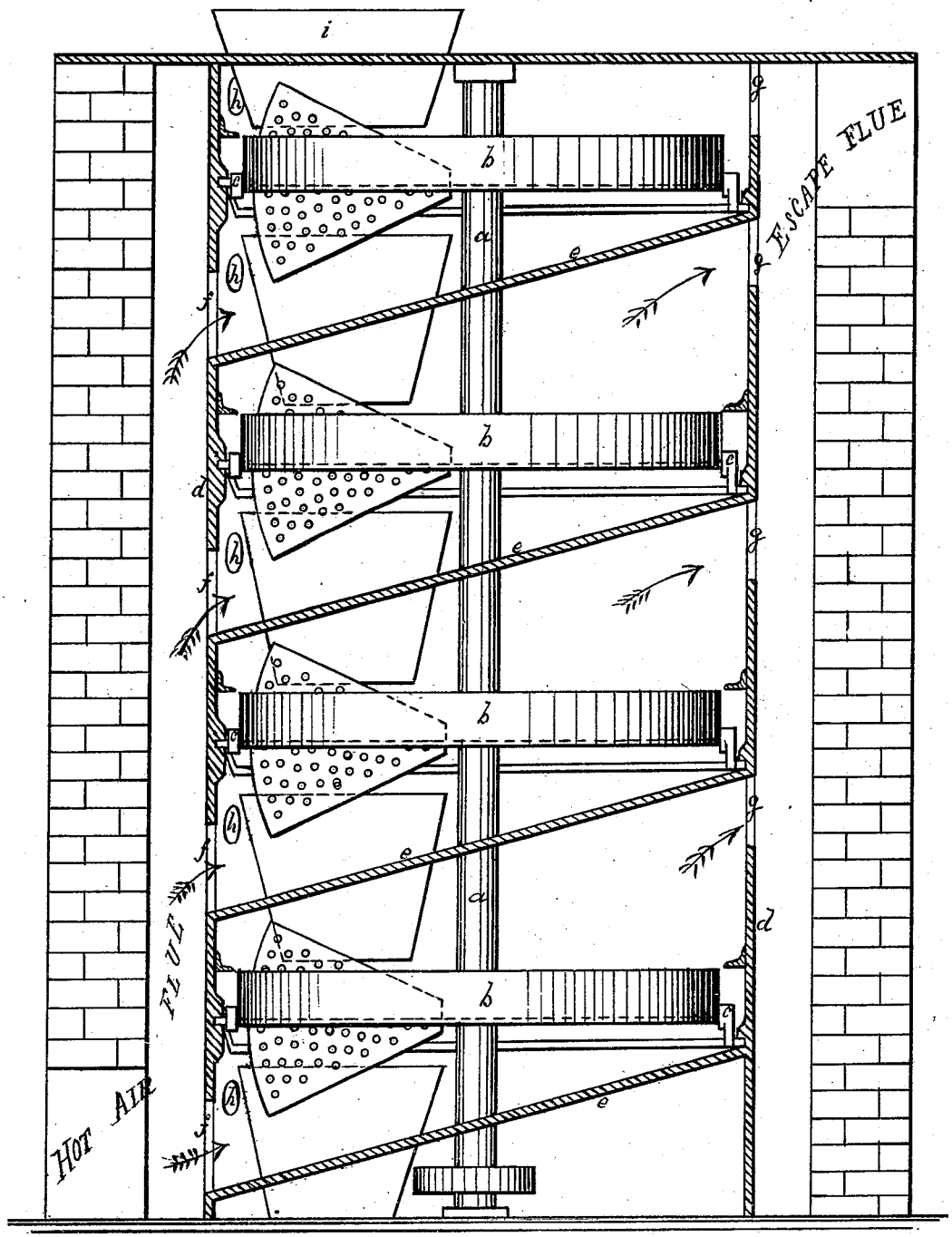

United States Patent Office.

HELEM MERRILL, OF BROOKLYN, NEW YORK.

Letters Patent No. 109,536, dated November 22, 1870.

IMPROVEMENT IN GRAIN-DRIERS.

The Schedule referred to in these Letters Patent and making part of the same.

I, HELEM MERRILL, of Brooklyn, in the county of Kings and State of New York, have invented certain Improvements in Grain-Driers, of which the following is a specification.

Nature and Objects of the Invention.

My invention relates to the drying of malt and grain by means of hot and cold air that pass through the grain, and may be regulated by dampers: and The apparatus consists of a series of trays or carriers, divided into segmental sections that are fitted with perforated movable bottoms, and which revolve within a tower provided with suitable flues.

The sections of the upper carrier are consecutively filled from a hopper entering the top of the apparatus, and after making a circuit comprising nearly an entire revolution, the bottom of each section is tipped or tilted to discharge the grain into a hopper that similarly supplies the sections of the carrier immediately below it, and revolving with the same shaft, and from which, in turn, it is similarly discharged. In this manner the grain is successively passed through the series of carriers, and at each stage is exposed to the action of a current of hot or cold air, or both, as may be regulated by suitable dampers.

The cylindrical case inclosing the revolving carriers is divided by partitions that separate the carriers and their contents, so that the vapor abstacted from each layer of grain is at once conducted to the flue provided for its escape.

Description of the Accompanying Drawing.

To enable others skilled in the art to which it appertains to make and use my invention, I will proceed to describe its construction and operation with reference to the drawing, in which is represented a sectional elevation of the apparatus.

The shaft $a$, which may be rotated by suitable gearing, carries a series of circular trays or grain-carriers $b$, that are divided into segmental sections, the bottoms of each of which are hung on pivots, and provided with a crank, $c$, by means of which they may be tilted to discharge the contents of the section at each revolution, as before described.

The cylindrical case $d$, inclosing the revolving shaft and sections, is provided with partitions $e$, that are placed in an inclined position to deflect the currents of air and vapor.

The hot air from the flue on one side enters each partition at the opening $f$, passes through the layer of grain resting on the perforated bottoms of the sections, and escapes with the vapor it has taken up by the opening $g$ into the general escape-flue, situated on the opposite side of the apparatus and leading to a chimney.

The openings $h$ are provided for the admission of cold air, which may sometimes be advantageously employed, and they may be connected with a common pipe, and furnished with dampers in any convenient manner.

The grain is shoveled into the hopper $i$ at the top of the apparatus and the revolving sections all successively filled, and the surplus grain struck from each section by its passage under the lower edge of the hopper.

Just before each section has completed its revolution, and before it again reaches the hopper from which it was filled, its bottom is caused to tilt and discharge the grain into a hopper beneath it and leading through the partition below it to the next lower series of revolving sections.

The grain may be thus discharged in any of the many ways that would suggest themselves to an ordinary mechanic.

The pin of the crank $c$ on each bottom may travel in a groove on the inner surface of the case or tower, so that the bottom will be held in a horizontal plane during the revolution of the shaft, except at that part where it is desired to discharge when a cam-like projection or departure of the groove from the horizontal plane lifts the pin and crank and tilts the bottom.

The same end may be effected by a cam on a supplementary shaft, the revolution of which shifts the cranks in a similar manner.

The passage of the grain into the hopper at the top into and through the carriers to the bottom is continuous, so that when the apparatus is fully at work it delivers the grain as fast as it is received.

When the heat imparted to the air is not sufficient to produce the current required, mechanical means may be employed to impel it more forcibly.

I make no claim to drying malt or grain on a series of stationary floors, from which it may be successively removed by revolving escapes; nor to the admission of heated air for that purpose to a tower; but the apparatus in general consists of a series of revolving floors or carriers sustaining the grain in separate layers, through which the heated air passes

Claims.

I claim as my invention—

1. Forcing air through revolving layers of malt or grain, substantially as described.

2. The sectional carriers with movable perforated bottoms.

2. The inclined division-plates or partitions $e$, that separate the revolving carriers, in the manner described.

HELEM MERRILL.

Witnesses:
 DANL. J. DAY,
 WM. KEMBLE HALL.